United States Patent
Kilkki et al.

(10) Patent No.: US 7,782,777 B2
(45) Date of Patent: Aug. 24, 2010

(54) METHOD AND SYSTEM FOR HANDLING NETWORK CONGESTION

(75) Inventors: Kalevi Kilkki, Espoo (FI); Jussi Ruutu, Espoo (FI)

(73) Assignee: Nokia Corporation, Espoo (FI)

(*) Notice: Subject to any disclaimer, the term of this patent is extended or adjusted under 35 U.S.C. 154(b) by 958 days.

(21) Appl. No.: 10/495,011

(22) PCT Filed: Nov. 23, 2001

(86) PCT No.: PCT/EP01/13660
§ 371 (c)(1),
(2), (4) Date: May 10, 2004

(87) PCT Pub. No.: WO03/045028
PCT Pub. Date: May 30, 2003

(65) Prior Publication Data
US 2004/0264377 A1    Dec. 30, 2004

(51) Int. Cl.
*G01R 31/08* (2006.01)
*G06F 15/16* (2006.01)

(52) U.S. Cl. .................... 370/235; 709/232

(58) Field of Classification Search ...... 370/230–235.1, 370/412, 413, 417, 418, 428, 429; 709/232, 709/225, 229
See application file for complete search history.

(56) References Cited

U.S. PATENT DOCUMENTS

| | | | |
|---|---|---|---|
| 5,963,543 A | 10/1999 | Rostoker et al. | |
| 5,999,518 A * | 12/1999 | Nattkemper et al. | 370/258 |
| 6,047,326 A * | 4/2000 | Kilkki | 709/228 |
| 6,052,375 A | 4/2000 | Bass et al. | |
| 6,091,709 A * | 7/2000 | Harrison et al. | 370/235 |
| 6,219,339 B1 | 4/2001 | Doshi et al. | |
| 6,388,992 B2 * | 5/2002 | Aubert et al. | 370/232 |
| 6,724,776 B1 * | 4/2004 | Jeffries | 370/468 |
| 2001/0032269 A1 | 10/2001 | Wilson | |
| 2001/0043565 A1 | 11/2001 | Chen et al. | |

FOREIGN PATENT DOCUMENTS

| | | |
|---|---|---|
| WO | WO 98/25382 | 6/1998 |
| WO | WO 98/33333 | 7/1998 |
| WO | WO 99/54829 | 10/1999 |

\* cited by examiner

*Primary Examiner*—Aung S Moe
*Assistant Examiner*—Redentor M Pasia
(74) *Attorney, Agent, or Firm*—Mintz, Levin, Cohn, Ferris, Glovsky and Popeo, P.C.

(57) ABSTRACT

The present invention relates to a method and system for handling congestion in a packet data network, wherein at least two operating modes of congestion handling are selected based on a detected congestion level. The operating modes will then affect the applied congestion handling modes to thereby achieve a flexible and automatic network response which is based on the congestion level. Thereby applications' quality requirements and service provider's business goals can both be met in an adequate manner.

23 Claims, 4 Drawing Sheets

| | $P_{req}$ | $P_{loss}$ (measured) | traffic Mbytes | congestion | weight | weighted congestion |
|---|---|---|---|---|---|---|
| Class 1 | $10^{-2}$ | $5\ 10^{-3}$ | 6 | 0.5 | 0.6 | 0.30 |
| Class 2 | $10^{-5}$ | $2\ 10^{-5}$ | 3 | 2 | 0.3 | 0.60 |
| Class 3 | $10^{-8}$ | 0 | 1 | 0 | 0.1 | 0.00 |
| Total | | | 10 | | | 0.90 |

METHOD AND SYSTEM FOR HANDLING NETWORK CONGESTION

FIELD OF THE INVENTION

The present invention relates to a method and system for handling network congestion in a packet data network, such as an IP network.

BACKGROUND OF THE INVENTION

Congestion in computer networks is becoming an important issue due to the increased mismatch in links speeds caused by intermixing of old and new technology. Recent technological advances have resulted in a significant increase in the bandwidth of computer network links. However, these new technologies must coexist with the old low bandwidth media. This heterogeneity has resulted in a mismatch of arrival and service rates in the intermediate nodes in the network causing increased queuing and congestion. If the load is small, throughput generally keeps up with the load. As the load increases, throughput increases. After the load reaches the network capacity, the throughput stops increasing. If the load is increased any further, queues start building, potentially resulting in packets being dropped. Throughput may suddenly drop when the load increases beyond this point and the network is said to be congested.

In the following, congestion handling methods are methods that aim at reducing or avoiding network congestion as well as methods optimizing network performance at the time of congestion. Thus, these methods cover, for example, a scheme which allows the network to operate at the point after which the increase in the throughput is small but results in a significant increase in the response time results. Another example is a scheme which tries to keep operating a network in the zone before packets start getting lost Modern packet data networks handle network congestion in a relatively simple-minded fashion. Typically, congestion is dealt with some packet discarding algorithm whose basic objective typically is to satisfy the quality requirements of applications. As to the packet discarding, this can be interpreted in a way that in the optimal case the packet loss ratio of each individual flow is at most the packet loss parameter defined by the characteristics of the application. From this viewpoint, it is usually assumed that during a congestion situation, the network nodes shall first discard packets with the loosest or lowest packet loss requirement. However, if this principle is used extensively, network resources are reserved or given primarily for flows and applications with the most stringent quality requirements. From the network and service provider viewpoint, this result may be totally unacceptable. For example, a video stream with high quality of service (QoS) requirements may take the place of ten voice streams with lower QoS requirements, whereas the revenue obtained from the single video stream is typically much lower than the revenue obtained from ten voice calls. Actually, what the service provider usually wants is either to divide the capacity evenly among the customers, or proportional to the fee paid by each customer. These two targets, to serve applications quality requirements, i.e. individual benefit, and to meet the service provider's business goals, i.e. global benefit, are difficult to reach at the same time.

SUMMARY OF THE INVENTION

It is therefore an object of the present invention to provide a method and system for handling network congestion, by means of which a flexible congestion handling scheme serving both of the above targets in an adequate manner can be provided.

This object is achieved by a method of handling network congestion in a packet data network, said method comprising the steps of:

determining a congestion level in said packet data network;

selecting based on said determined congestion level one of at least two operating modes for performing said network congestion handling.

Furthermore, the above object is achieved by a system for handling network congestion in a packet data network, wherein said system is arranged to determine a congestion level in said packet data network, and to select based on said determined congestion level one of at least two operating modes for said network congestion handling.

Additionally, the above object is achieved by a network element for handling network congestion in a packet data network, said network element being arranged to determine a congestion level in said network element, and to select based on said determine congestion level one of at least two operating modes for said network congestion handling.

Accordingly, network congestion handling can be optimized based on the detected network congestion level. If the network congestion level is small, it is possible to optimize the network congestion handling algorithm based on applications quality requirements in one operating mode, because occasional congestion handling actions do not have a significant effect on the sharing of network resources. In contrast thereto, if the network congestion level is high, other network congestion handling rules can be defined in another operating mode, wherein the total resources are divided between traffic flows. In other words, the operator supports the interests of individual applications as long as the network congestion level is low enough and the business objectives of the operator are not threatened. Once the network congestion level gets worse, a new operating mode is selected to take into account the overall and not individual interests.

The at least two operating modes may be based on at least one of a packet discarding method, a method involving a reduction of traffic inserted to the network, and a method of shortening or compressing data packets. The at least two operating modes may comprise a quality-based operating mode for controlling network congestion based on quality requirements of applications, and a quantity-based operating mode for controlling network congestion based on a desired sharing of resources between different flows and/or customers. In particular, the quality-based operating mode is preferably selected at a lower congestion level, and the quantity-based operating mode is preferably selected at a higher congestion level. If the quality-based operating mode is set, the determined congestion level is checked, and the operating mode is changed to the quantity-based operating mode if the congestion level exceeds a first predetermined threshold level. On the other hand, if the quantity-based operating mode is set, the determined congestion level is checked and the operating mode is changed to the quality-based operating mode if the congestion level falls below a second predetermined threshold level. Preferably, the second predetermined threshold level is lower than the first predetermined threshold level, to thereby provide a certain switching hysteresis by means of which excessive switching between operating modes can be prevented. The quality-based operating mode may be used as an initial default operating mode. Furthermore, the first and second predetermined thresholds may correspond to first and second packet loss ratios, respectively.

The determination step may be performed by measuring the average packet loss ratio during a predetermined time period. In particular the average packet loss ratio may be an exponentially weighted moving average. As an alternative, the determination step may be performed by applying a weighting scheme. In this case, packet loss values may be weighted based on different classes defining maximum allowed packet loss ratios.

According to an advantageous further development, the at least two operating modes may comprise a first operating mode applied below a first congestion level and using no congestion handling methods, a second operating mode applied between the first and a higher second congestion level and using a congestion handling method based on quality requirements of applications, a third operating mode applied between said second and a higher third congestion level and using a congestion handling method based on a reduction of a traffic amount inserted to the packet data network, and a fourth operating mode applied above said third congestion level and using a congestion handling method based on a desired sharing of resources between different flows and/or customers. The congestion handling method of the second operating mode may be adapted to first discard data packets with highest allowed packet loss ratios in a way that packet loss ratios of different quality categories remain on an acceptable level. Furthermore, the congestion handling method of the third operating mode may be adapted to control adaptive traffic sources in a way that a congestion situation is alleviated before the congestion situation reaches said third congestion level. Moreover, the congestion handling method of the fourth operating mode may be adapted to divide the capacity of the packet data network proportional to nominal bit rates.

The congestion level may be determined using at least one parameter related to said network congestion. The at least one parameter may comprise packet loss ratios, filling levels of token buckets, buffer lengths in terms of number of packets or number of bytes, buffering delays for packets, measured bit rates of links and QoS thresholds.

The network congestion handling system may be arranged to determine the congestion level in a predetermined network element, in a predetermined number of network elements, or in the whole packet data network. The congestion may be determined based on the whole traffic or only a subset of traffic, e.g. some traffic class or classes in the network element, network elements or packet data network.

The network congestion handling network element may be a router or a buffer for an outgoing link in the packet data network.

Further advantageous developments are defined in the dependent claims.

BRIEF DESCRIPTION OF THE DRAWINGS

In the following the present invention will be described in greater detail based on preferred embodiments with reference to the accompanying drawings in which.

DESCRIPTION OF THE PREFERRED EMBODIMENTS

The preferred embodiments of the present invention will now be described based on a multimode congestion handling system for packet networks, such as IP networks.

Figure 1:
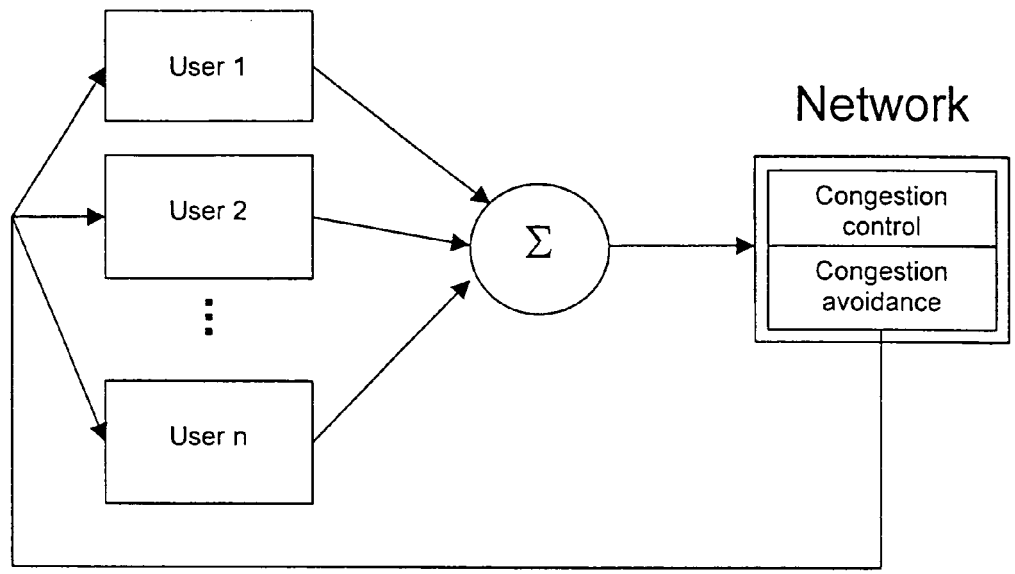
FIG. 1 shows a schematic architecture of a control system for handling network congestion, according to the preferred embodiments.

FIG. 1 shows an architecture of a congestion handling scheme or a network with n users sharing it. The congestion state of the system is determined by the number of packets in the system. The total load at a bottleneck resource corresponds to the sum of the individual loads of the users 1 to n. Usually, all resources demanded by the users 1 to n are granted. The network comprises a congestion handling function with a congestion control feature and a congestion avoidance feature.

The congestion avoidance feature generates a feedback information, e.g. a binary feedback, which controls traffic sources of the users 1 to n so as to increase or decrease their load. Thus the congestion avoidance function is arranged to prevent the network from becoming congested.

On the other hand, the congestion control function is arranged to recover the network from a congested state of high delay and low throughput. This may be achieved by discarding data packets or by shortening or compressing data packets.

According to the preferred embodiments, the congestion handling scheme is automatically selected by the network based on a detected congestion level to thereby achieve a flexible congestion response of the system.

Figure 2:
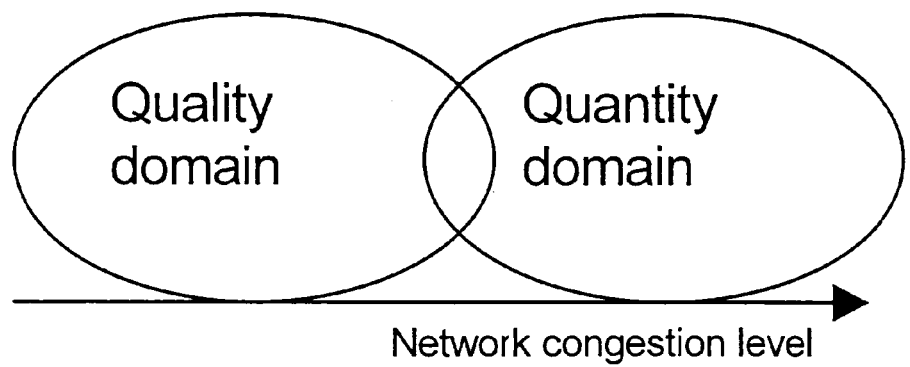
FIG. 2 shows a schematic diagram indicating different control domains depending on the network congestion level, according to the preferred embodiments.

FIG. 2 shows a schematic diagram of the basic principle underlying the present invention. In particular, different congestion handling operating modes are selected based on the network congestion level. These operating modes define a quality domain and a quantity domain of their congestion handling procedure. In the quality domain where the network congestion level is small, the network congestion handling algorithm is optimized based on applications quality requirements, because occasional congestion handling actions such as packet discarding do not have a significant effect on the sharing of network resources. In contrast thereto, in the quantity domain where the network congestion level is high, network congestion handling rules essentially define how the total resources are divided between the traffic flows of the users 1 to n. Thus, in the quality domain, the operator supports the interests of individual applications of the users 1 to n as long as the network congestion level is low enough and business objectives such as maximization of revenue of the operator are not threatened. In the quantity domain where the network congestion gets worse, overall interests of the users 1 to n are taken into account and traffic volumes, i.e. quantity, are handled instead of individual quality.

In other words, at small network congestion levels, the optimal congestion handling algorithm is based on applications quality requirements due to the fact that the effect of fulfilling the QoS requirements of a single application of the users 1 to n does not have any significant effect on the operator's business objectives. In contrast thereto, at high network congestion levels, the target of the congestion handling system is to realize a desired sharing of resources between different flows and/or users or customers according to the operator's business objectives due to the fact that it is not reasonable anymore to try to optimize the QoS for single applications. Thereby, the present invention provides an advanced network congestion handling system that takes into account both the applications' and the service provider's business targets, as well as any other target that requires specific congestion handling mechanisms.

In particular, according to the preferred embodiments, the network congestion handling system may have two or more operating modes. The selection of the operating mode may depend on the congestion situation in a single network element, a predetermined number of network elements, or the whole network. The congestion may be determined based on the whole traffic or only some traffic class or classes in the network element, network elements or packet data network. The network congestion level may be expressed as one or a combination of parameters such as, a buffer occupancy level, measured bit rates of links, QoS thresholds (e.g. allowed priority of Simple Integrated Media Access (SIMA)), occupancy level of a token bucket and the like. The operating modes may be based on congestion control functions such as packet discarding methods or methods that shorten or compress IP packets etc., or may be based on congestion avoidance functions such as methods that involve the reduction of traffic inserted to the network (e.g. methods having effect on the Transmit Control Protocol (TCP) flow control).

If the congestion handling system is arranged to perform the congestion handling in a single network element, this may be an inner part of a router or a buffer for an outgoing link, or any other unit that includes a mechanism to handle network congestion.

Figure 3:
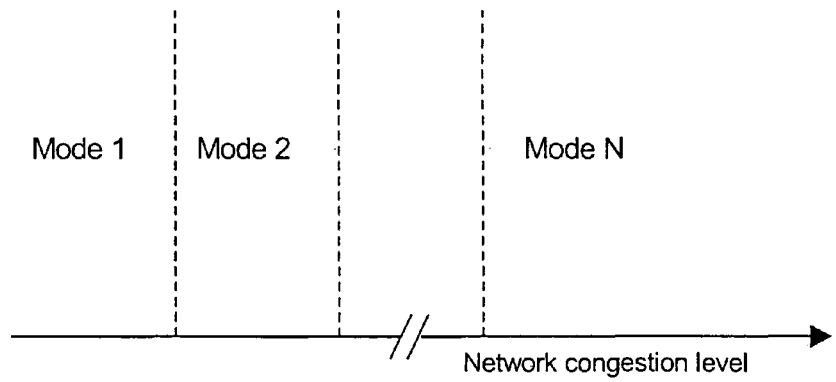
FIG. 3 shows an arrangement of several operating modes for handling network congestion depending on the level of congestion.

FIG. 3 shows a diagram indicating several operating modes for handling network congestion depending on the level of congestion. According to FIG. 3, the number of the operating mode increases with increased network congestion level. Each of the operating modes 1 to n may be based on specific congestion control and/or congestion avoidance functions thereby provide a flexible network response to any congestion situation.

In the following, a four-mode system according to a first preferred embodiment and a two-mode system according to a second preferred embodiment are described with reference to FIGS. 4 to 6.

Figure 4:
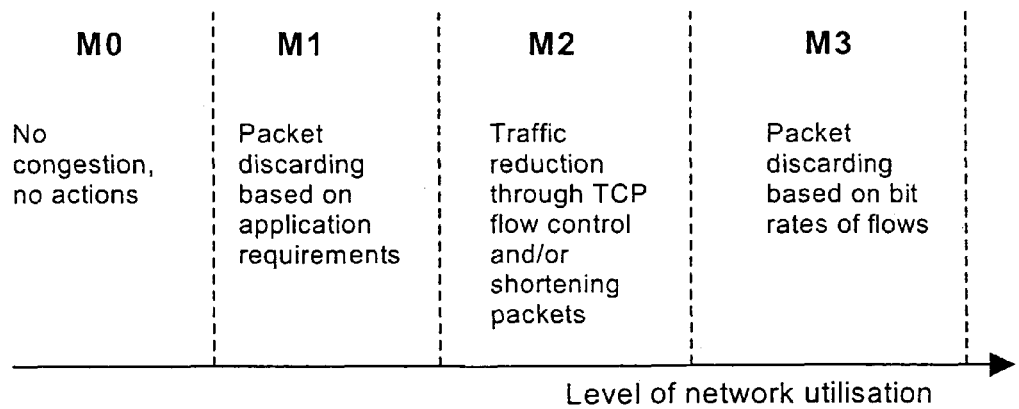
FIG. 4 shows a congestion handling scheme based on four operating modes according to a first preferred embodiment.

FIG. 4 shows a diagram indicating four specific operating modes M0 to M3 according to the first preferred embodiment and their congestion handling methods. In the operating mode M0, no congestion control methods, such as packet discarding or the like, are applied in case of no or very low congestion below a first threshold level separating the modes M0 and M1. In the operating mode M1, a packet discarding algorithm is used which is solely based on the packet loss requirement of each application without taking into account the bit rates of the flows. Above a second predetermined threshold level separating the operating modes M1 and M2, the intermediate operating mode M2 is selected which may include, for instance, a congestion avoidance algorithm which tries to reduce the amount of traffic inserted to the network by a corresponding feedback information allowing a TCP flow control. Additionally or alternatively, a mechanism for shortening or compressing data packets may be applied in the intermediate operating mode M2. Above a third threshold level separating the operating modes M2 and M3, a congestion handling mechanism is selected in the operating mode M3 so as to divide the capacity evenly among all customers or users by using information about the momentary bit rates of the flows.

Thus, during lack of or low level of network congestion in the operating mode M0, there is no need to apply any network congestion handling actions, such as packet discarding. In this case application requirements of the users 1 to n are met and the operator's overall business objectives are not threatened.

During mild congestion in the operating mode M1, the system can be based on a number of predefined categories each with a different maximum packet loss ratio, for instance, $10^{-8}, 10^{-6}, 10^{-4}, 10^{-2}$. In the operating mode M1, the network unit or network first discards packets with the highest allowed packet loss ratio, in a way that at least in most cases the packet loss ratio of each category will remain on an acceptable level. The information about the packet loss ratio can be marked into the packet.

During intermediate network congestion in the operating mode M2, adaptive traffic sources may be controlled based on a feedback information. For example, TCP flows may be handled in a way that the congestion situation is alleviated before the congestion situation reaches a level in which the mode is changed to the operating mode M3. This kind of TCP flow control optimization may be based on an adjustment of the TCP sliding window and other known TCP flow control methods. As an alternative, the intermediate operating mode M2 may be arranged to utilize a congestion handling mechanism which involves the shortening of the length of the IP packets. In this case, the congestion is alleviated by either discarding some parts of the IP packets or by applying a compression scheme to the IP header and/or the payload portion.

During a state of severe congestion in the operating mode M3, the congestion handling system may effectively be used to divide the network capacity proportional to the nominal bit rates (NBR). This kind of system is preferably when the congestion situation is so severe that the network has to discard considerable amounts of packets.

Figure 5:
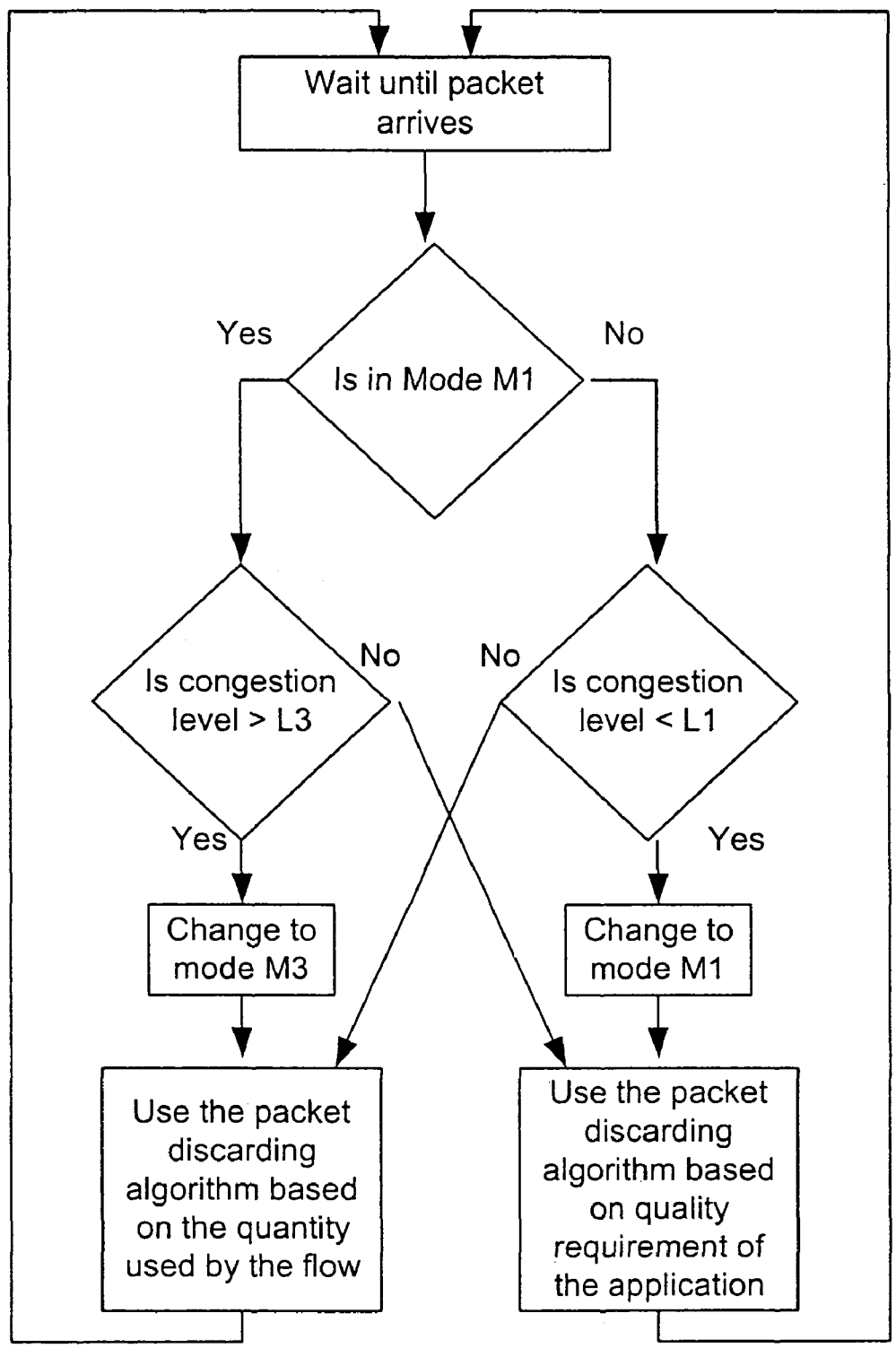
FIG. 5 shows a flow diagram indicating a congestion handling processing based on two operating modes according to a second preferred embodiment.

FIG. 5 shows a flow diagram indicating a congestion handling processing in a two-mode system according to the second preferred embodiment. The two operating modes consist of a first operating mode M1 for a mild congestion situation and a second operating mode M3 for a severe congestion situation. Thus, in the second preferred embodiment, the intermediate operating mode M2 described in the first preferred embodiment has been omitted and the operating modes M0 and M1 of the first preferred embodiment have been merged together, while the same denotation is used for the operating modes for mild and severe congestion, for reasons of clarity.

The packet discarding procedure shown in FIG. 5 is as follows. When a packet arrives at a network unit responsible for network congestion handling, it is first checked whether the unit is in the first operating mode M1. If so, a check is performed as to whether the congestion level exceeds a threshold level L3. If this is the case, the operating mode is changed to the second operating mode M3, in which the packet discarding mechanism is based on the quantity used by the flow. If the congestion level is below the threshold level L3, the first operating mode M1 is maintained and a packet discarding mechanism based on quality requirements of the applications is used.

On the other hand, if the unit is not in the operating mode M1 when the packet arrives, it is checked whether the congestion level is below another predetermined threshold level L1. If not, then a second operating mode M3 is maintained and a packet discarding mechanism based on the quantity used by the flow is applied. On the other hand, if the congestion level is below the other threshold level L1, the operating mode is changed to the first operating mode M1 in which the packet discarding mechanism is based on the quality requirement of the application.

If there is a need to discard one or more packets, the algorithm of the proper discarding mode is applied, and the most appropriate packet to be discarded is selected. Thus, the congestion handling system starts from the operating mode M1 as a default operating mode for a situation without any or low congestion.

Figures 6, 7:
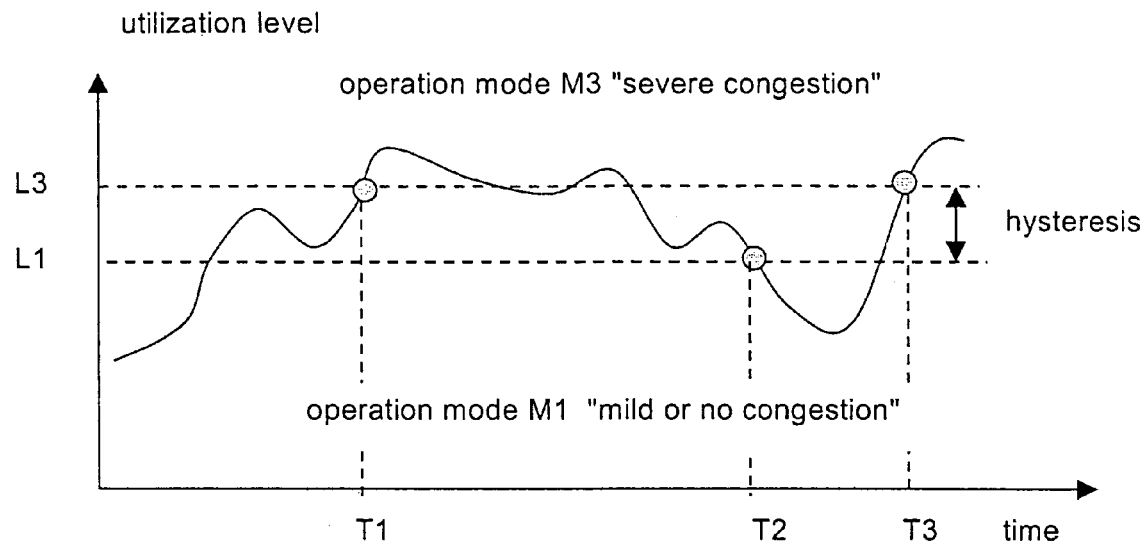
FIG. 6 shows a diagram indicating a time-dependent behavior of a two-mode-system according to the second preferred embodiment.
FIG. 7 shows a table indicating determined weighted congestion levels.

FIG. 6 shows a diagram indicating a time-dependent behavior of the congestion handling system according to second preferred embodiment. Before a time T1, the system starts in the first operating mode. M1 at a very low congestion. Then, the congestion or utilization level gradually increases and exceeds the upper threshold level L3 at the time T1. At this point in time, the operating mode is changed to the second operating mode M3. Then, after a while, the congestion level falls again below the other lower threshold level L1 and the operating mode is changed back to the first operating mode M1. The difference between the upper threshold level L3 and the lower threshold level L1 defines a hysteresis suitable to prevent too frequent or excessive changes between the operating modes.

The network congestion level measurement or detection may be performed by measuring the average packet loss ratio during a given period of time. Any suitable measuring principle can be used, such as an exponentially weighted moving average which gives an average packet loss ratio weighted with an exponential function. The congestion handling system may be implemented in a way that the threshold levels L1 and L3 in FIG. 6 correspond to two packet loss ratios, for instance $10^{-4}$ and $10^{-2}$. Then, the operating mode is changed to the second operating mode M3 for severe congestion when the average packet loss ratio exceeds 1% and returns to the first operating mode M1 for mild or no congestion when the packet loss ratio falls below 0.01%.

Another possible implementation is based on a weighted congestion level. In this case, the congestion level C can be based on weighted packet loss values as given by the following equation:

$$C = \frac{\sum_{i=1}^{N} B_i \cdot \frac{P_{loss,i}}{P_{req,i}}}{\sum_{i=1}^{N} B_i}$$

where $P_{loss,i}$ denotes the measured packet loss ratio in a quality class i (during the time intervall t), $P_{req,i}$ denotes the maximum allowed packet loss ratio in the class i, $B_i$ denotes the incoming number of bytes in the class i, and N denotes the number of classes.

FIG. 7 shows a table indicating an example of calculations with three different quality classes, wherein no congestion is determined for a class 3 of highest quality requirements, and highest congestion is determined for an intermediate class 2. Due to the fact that the applied weights increase with the number of received bytes in the respective class, the impact of the high traffic class 1 packet loss ratio on the total congestion level is emphasized.

The principle presented in FIG. 6 may also be applied in this case of determining a weighted congestion level. For instance, the upper threshold level L3 in FIG. 6 may be "1" and the lower threshold level L1 may be "0.1". The difference between the threshold levels L3 and L1 should be large enough due to the fact that the packet loss ratio may vary very quickly. The dynamics of the system also depend on the measuring interval which should be selected according to the desired requirements.

It is noted that the present invention may be applied in any packet data network having a mechanism to handle network congestion. Furthermore, the at least two different operating modes may be based on any congestion control or congestion avoidance mechanism suitable to achieve the desired flexible response of the network. Thus, the preferred embodiments may vary within the scope of the attached claims.

The invention claimed is:

1. A method comprising:
   determining whether a packet data network is operating in one of two operating modes;
   determining a congestion level in said packet data network based on whether the packet data network is operating in the one of the two operating modes; and
   selecting, based on said determined congestion level, one of the two operating modes for performing a network congestion handling, wherein the two operating modes comprise one or more of a first operating mode, a second operating mode, a third operating mode, a fourth operating mode, wherein the first operating mode is applied below a first congestion level and uses no congestion control methods, the second operating mode is applied between said first congestion level and a higher second congestion level and uses a second congestion control method based on quality requirements of applications, the third operating mode is applied between said second congestion level and a higher third congestion level and uses a third congestion control method based on a reduction of a traffic amount inserted to said packet data network, and the fourth operating mode is applied above said third congestion level and uses a fourth congestion control method based on a sharing of resources between at least one of different flows and customers, wherein the sharing of resources divides a capacity of said packet data network proportional to nominal bit rates,
   wherein the two operating modes comprise a quality-based operating mode configured to control a first network congestion based on quality requirements of the applications, and a quantity-based operating mode configured to control a second network congestion based on the sharing of resources between at least one of the different flows and customers, and
   wherein said quality-based operating mode is selected at a lower congestion level, and said quantity-based operating mode is selected at a higher congestion level,
   wherein the selecting is implemented by network element.

2. A method according to claim 1, wherein said selecting the one of said two operating modes is based on at least one of a packet discarding method, a method involving a reduction of traffic inserted to the network, a method of shortening or compressing data packets, and a method of arranging more network resources.

3. A method according to claim 1, further comprising:
   changing to said quantity-based operating mode when said quality-based operating mode is set and said determined congestion level exceeds a first predetermined threshold level.

4. A method according to claim 3, further comprising:
changing to said quality-based operating mode when said quantity-based operating mode is set and said determined congestion level is below a second predetermined threshold level.

5. A method according to claim 4, wherein said changing to said quality-based operating mode comprises changing to said quality-based operating mode when said second predetermined threshold level is lower than said first predetermined threshold level.

6. A method according to claim 5, wherein said first predetermined threshold level and said second predetermined threshold level correspond to a first packet ratio and a second packet loss ratio, respectively.

7. A method according to claim 1, further comprising:
using said quality-based operating mode as an initial default operating mode.

8. A method according to claim 1, wherein said determining said congestion level comprises using at least one parameter related to said network congestion.

9. A method according to claim 8, wherein said using comprises using said at least one parameter comprising packet loss ratios, filling levels of token buckets, buffer lengths in terms of number of packets or number of bytes, buffering delays for packets, measured bit rates of links, and quality of service thresholds.

10. A method according to claim 8, wherein said
using comprises using said at least one parameter comprising a measured parameter of the whole traffic or a subset of traffic in said packet data network.

11. A method according to claim 10, wherein said using comprises using said at least one parameter comprising said subset of traffic corresponding to predetermined traffic classes.

12. A method according to claim 1, wherein said determining the congestion level in said packet data network comprises measuring an average packet loss ratio during a predetermined time period.

13. A method according to claim 12, wherein said determining the congestion level in said packet data network comprises measuring said average packet loss ratio comprising an exponentially weighted moving average.

14. A method according to claim 1, wherein said determining the congestion level in said packet data network comprises applying a weighting scheme.

15. A method according to claim 1, wherein said determining the congestion level in said packet data network comprises applying said weighting scheme comprising packet loss values weighted based on different classes defining maximum allowed packet loss ratios.

16. A method according to claim 1, wherein said selecting comprises selecting said one of the two operating modes comprising said congestion control method of said second operating mode being configured to first discard data packets with highest allowed packet loss ratios in a way that packet loss ratios of different quality categories remain on an acceptable level.

17. A method according to claim 1, wherein said selecting comprises selecting said one of the two operating modes comprising said congestion control method of said third operating mode being configured to control adaptive traffic sources in a way that a congestion situation is alleviated before said congestion situation reaches said third congestion level.

18. An apparatus, comprising:
a network element configured to:
determine whether a packet data network is operating in one of two operating modes;
determine a congestion level in said packet data network based on whether the packet data network is operating in the one of the two operating modes;
select, based on said determined congestion level, one of the two operating modes to perform a first network congestion handling, wherein the two operating modes comprise one or more of a first operating mode, a second operating mode, a third operating mode, a fourth operating mode, wherein the first operating mode is applied below a first congestion level and uses no congestion control methods, the second operating mode is applied between said first congestion level and a higher second congestion level and uses a second congestion control method based on quality requirements of applications, the third operating mode is applied between said second congestion level and a higher third congestion level and uses a third congestion control method based on a reduction of a traffic amount inserted to said packet data network, and the fourth operating mode is applied above said third congestion level and uses a fourth congestion control method based on a sharing of resources between at least one of different flows and customers, wherein the sharing of resources divides a capacity of said packet data network proportional to nominal bit rates, wherein the two operating modes comprise a quality-based operating mode configured to control a network congestion based on quality requirements of applications, and a quantity-based operating mode configured to control a second network congestion based on a desired sharing of resources between at least one of different flows and customers, and
wherein said quality-based operating mode is selected at a lower congestion level, and
said quantity-based operating mode is selected at a higher congestion level.

19. An apparatus according to claim 18, wherein said network element is further configured to determine said congestion level in a predetermined network element.

20. An apparatus according to claim 18, wherein said network element is further configured to determine said congestion level in a predetermined number of network elements.

21. An apparatus according to claim 18, wherein said network element is further configured to determine said congestion level in the whole packet data network.

22. An apparatus according to claim 18, wherein said congestion level is determined based on either the whole traffic or a subset of traffic.

23. An apparatus according to claim 18, wherein said apparatus is a router or a buffer for an outgoing link in said packet data network.

* * * * *